G. G. PERCIVAL.
Tumblers, Pitchers, &c.

No. 48,996. Patented July 25, 1865.

Witnesses:
Theo Tysch,
J. M. Covington

Inventor:
G. G. Percival
By Munn & Co.

UNITED STATES PATENT OFFICE.

GEORGE G. PERCIVAL, OF BROOKLYN, NEW YORK.

IMPROVEMENT IN TUMBLERS, PITCHERS, &c.

Specification forming part of Letters Patent No. 48,996, dated July 25, 1865.

*To all whom it may concern:*

Be it known that I, GEORGE G. PERCIVAL, of Brooklyn, in the county of Kings and State of New York, have invented a new and useful Improvement in Tumblers, Pitchers, &c.; and I do hereby declare that the following is a full, clear, and exact description thereof, which will enable those skilled in the art to make and use the same, reference being had to the accompanying drawings, forming part of this specification.

The present invention consists in attaching to tumblers, glasses, pitchers, and other similar articles made of crockery or glass, so as to extend around the lower edge thereof, a rim of india-rubber, or of any of its elastic compounds, for the purpose of preventing them from being broken if too carelessly or heavily placed upon a table, &c., as well as also to prevent them from scratching, marring, or in any other manner defacing the surface of the same.

My improvement is represented in accompanying plate of drawings, of which—

Figure 1:
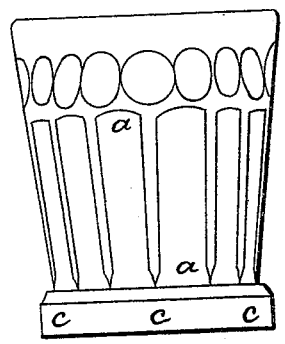
Figure 2:
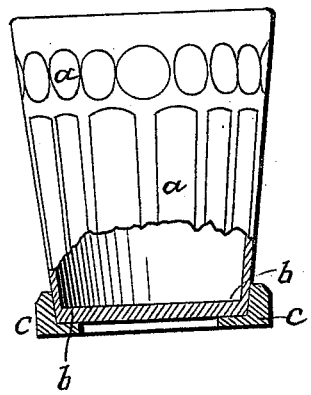

Figure 1 is a side view of a tumbler with the rim attached, and Fig. 2 a part sectional view of the same.

*a a* in the drawings represent a tumbler made of glass, of any desired size and shape, to the bottom edge, *b*, of which, and extending entirely around and under the lower surface thereof, a rim, *c*, of india-rubber, or of any of its elastic compounds, is attached.

The rubber rim may be secured to the tumbler by means of cement or any other suitable adhesive material, or may be made of little smaller dimensions than the bottom edge of the tumbler, so that by being simply sprung over and upon the same it will conform to and tightly hold itself upon the tumbler by its elasticity alone. The rubber rim may be also made of various shapes and thicknesses, and may be either molded in a proper-shaped mold or cut or stamped out of a sheet of rubber of the proper thickness. It may be also either made with a projecting shoulder extending around and under the bottom of the tumbler, as seen in the drawings, or be made in the shape of a ring of sufficient width to project over the lower edge of the tumbler and extend up the side surface thereof a sufficient distance to enable it to be firmly secured thereon or attached thereto.

By attaching to the bottom edge of a tumbler a rubber rim by any of the modes hereinabove described it is evident an elastic edge is given thereto, which, when the tumbler is hastily, carelessly, or heavily placed upon the table, &c., prevents all possibility of its being broken, and, furthermore, serves to prevent the scratching, marring, or otherwise defacing the table, which often occurs by the use of tumblers not provided with such a rim.

The rubber rim herein described as applied to a tumbler may be as well applied to a pitcher, wine-glass, or any other article of crockery or glass, and in any of the modes specified.

It may be here remarked that there are other and various modes of attaching a rubber or elastic rim to a tumbler than those herein described, and therefore I do not intend to limit myself to any particular mode of attachment.

I claim as new and desire to secure by Letters Patent—

As a new article of manufacture, the attachment of a rim made of india-rubber or any of its elastic compounds to and upon the bottom edges of tumblers, glasses, pitchers, and other articles of crockery or glassware, substantially as and for the purposes specified.

GEO. G. PERCIVAL.

Witnesses:
ALBERT W. BROWN,
O. L. TOPLIFF.